United States Patent
Smith et al.

(10) Patent No.: US 9,122,278 B2
(45) Date of Patent: Sep. 1, 2015

(54) VEHICLE NAVIGATION

(75) Inventors: Christopher Andrew Smith, Bristol (GB); Geoffrey James Hester, Bristol (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 14/122,147

(22) PCT Filed: May 22, 2012

(86) PCT No.: PCT/GB2012/051156
§ 371 (c)(1),
(2), (4) Date: Nov. 25, 2013

(87) PCT Pub. No.: WO2012/160373
PCT Pub. Date: Nov. 29, 2012

(65) Prior Publication Data
US 2014/0136046 A1   May 15, 2014

(30) Foreign Application Priority Data

May 24, 2011  (EP) .................................... 11250557
May 24, 2011  (GB) .................................. 1108965.3

(51) Int. Cl.
*G01C 21/00* (2006.01)
*G05D 1/02* (2006.01)

(52) U.S. Cl.
CPC .............. *G05D 1/0212* (2013.01); *G05D 1/024* (2013.01); *G05D 1/0278* (2013.01); *G05D 1/027* (2013.01);
(Continued)

(58) Field of Classification Search
CPC ... G05D 1/0278; G05D 1/027; G05D 1/0272; G05D 1/0274; G05D 2201/0213; G05D 1/0242; G05D 1/0214; G05D 1/0251; G05D 1/0255; G05D 1/0257; G05D 1/0238; G05D 1/0246; G05D 1/0248
USPC ............ 701/408, 23, 301, 26, 514, 2, 25, 300
See application file for complete search history.

(56) References Cited

U.S. PATENT DOCUMENTS

2002/0099481 A1   7/2002  Mori
2006/0089764 A1*  4/2006  Filippov et al. ................. 701/23
(Continued)

FOREIGN PATENT DOCUMENTS

EP   1 898 181 A1   3/2008

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Nov. 26, 2013, in the corresponding International Application No. PCT/GB2012/051156. (8 pages).
(Continued)

*Primary Examiner* — Redhwan k Mawari
(74) *Attorney, Agent, or Firm* — Finch & Maloney PLLC

(57) ABSTRACT

A method and apparatus for establishing a route for an autonomous vehicle, the method including: determining localization information for the vehicle with respect to a first frame of reference that is fixed with respect to a current state of the vehicle; determining localization information for the vehicle with respect to a second frame of reference that is fixed with respect to an entity (e.g. Earth), the vehicle being moveable with respect to the entity; establishing a route for the vehicle with respect to the second frame using the localization information for the vehicle with respect to the second frame; transforming the route from the second frame to the first frame; and determining a route for the vehicle with respect to the first frame using the localization information for the vehicle with respect to the first frame and the transformed route.

18 Claims, 6 Drawing Sheets

(52) U.S. Cl.
CPC ............ *G05D 1/0246* (2013.01); *G05D 1/0261* (2013.01); *G05D 1/0272* (2013.01); *G05D 1/0274* (2013.01); *G05D 2201/0213* (2013.01)

(56) References Cited

U.S. PATENT DOCUMENTS

| | | | |
|---|---|---|---|
| 2006/0106533 A1* | 5/2006 | Hirokawa | 701/207 |
| 2007/0219720 A1 | 9/2007 | Trepagnier et al. | |
| 2007/0244640 A1 | 10/2007 | Hirokawa | |
| 2010/0066587 A1 | 3/2010 | Yamauchi et al. | |
| 2010/0106356 A1 | 4/2010 | Trepagnier et al. | |
| 2010/0114416 A1* | 5/2010 | Au et al. | 701/23 |
| 2014/0136046 A1* | 5/2014 | Smith et al. | 701/25 |

OTHER PUBLICATIONS

International Search Report (PCT/ISA/210) mailed on Mar. 14, 2013, by the British Patent Office as the International Searching Authority for International Application No. PCT/GB2012/051156.

Written Opinion (PCT/ISA/237) mailed on Mar. 14, 2013, by the British Patent Office as the International Searching Authority for International Application No. PCT/GB2012/051156.

Search Report mailed on Aug. 10, 2011, by the British Patent Office for Application No. 1108965.3.

Search Report mailed on Nov. 18, 2011, by the European Patent Office for Application No. 11250557.3.

* cited by examiner

To 12

To 12

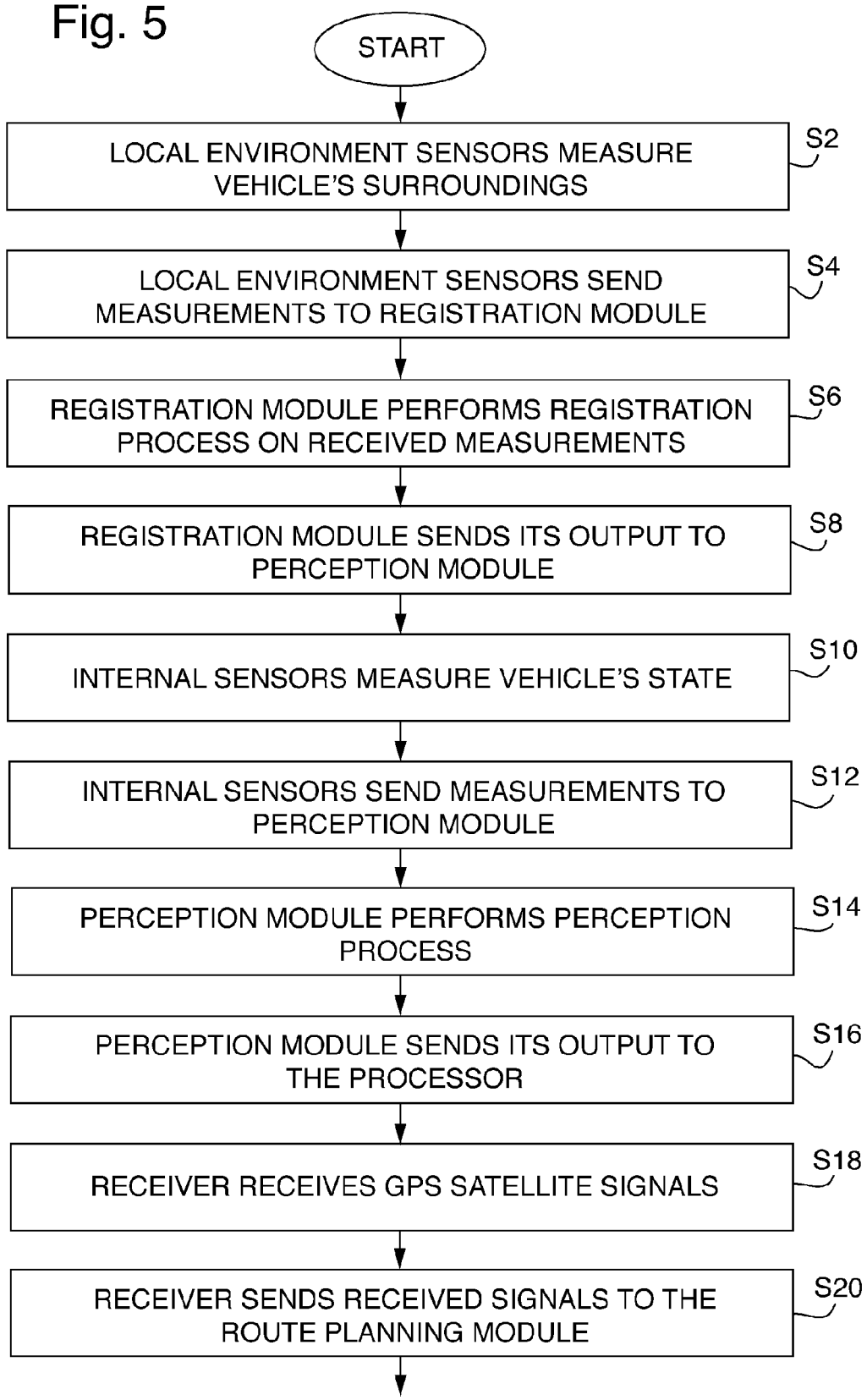

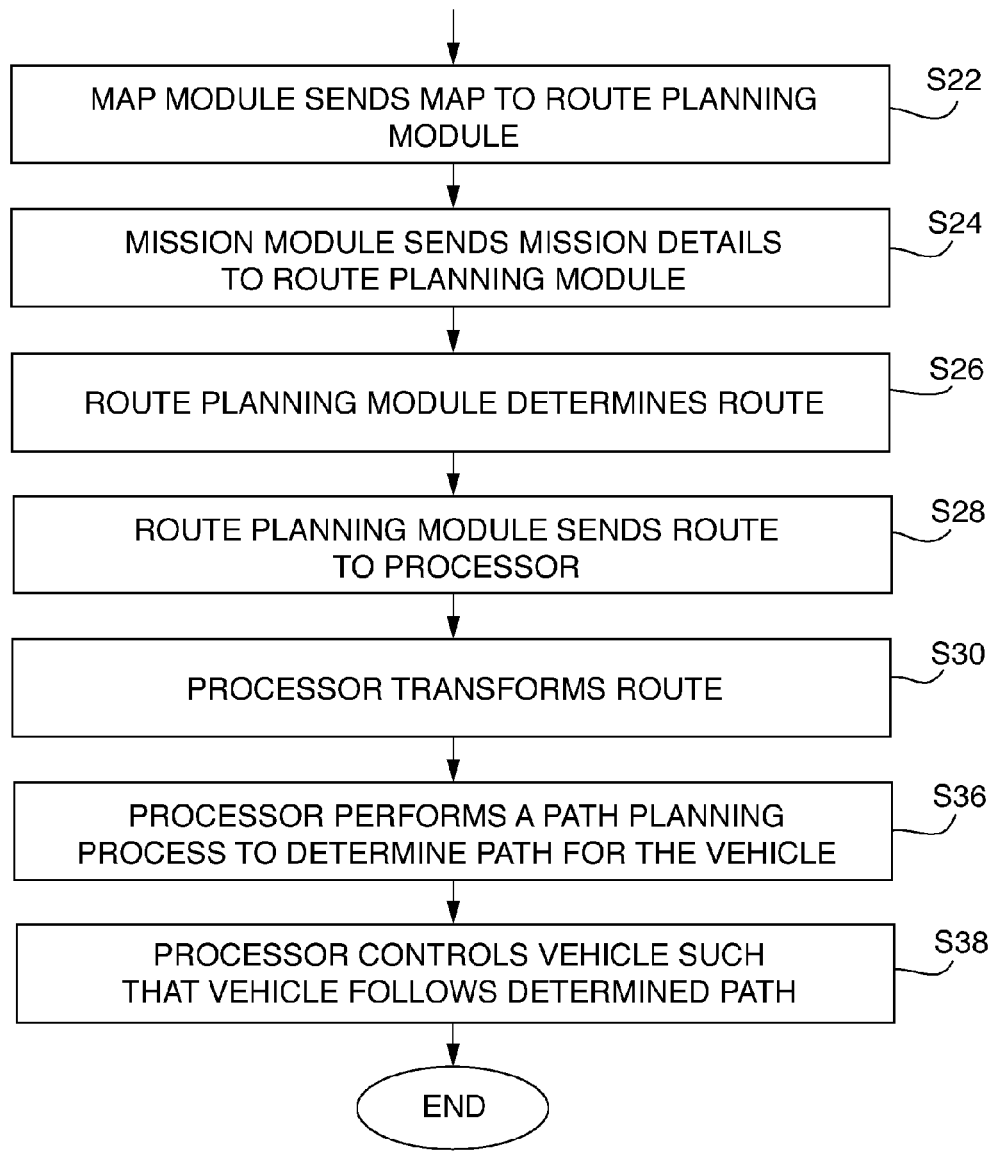

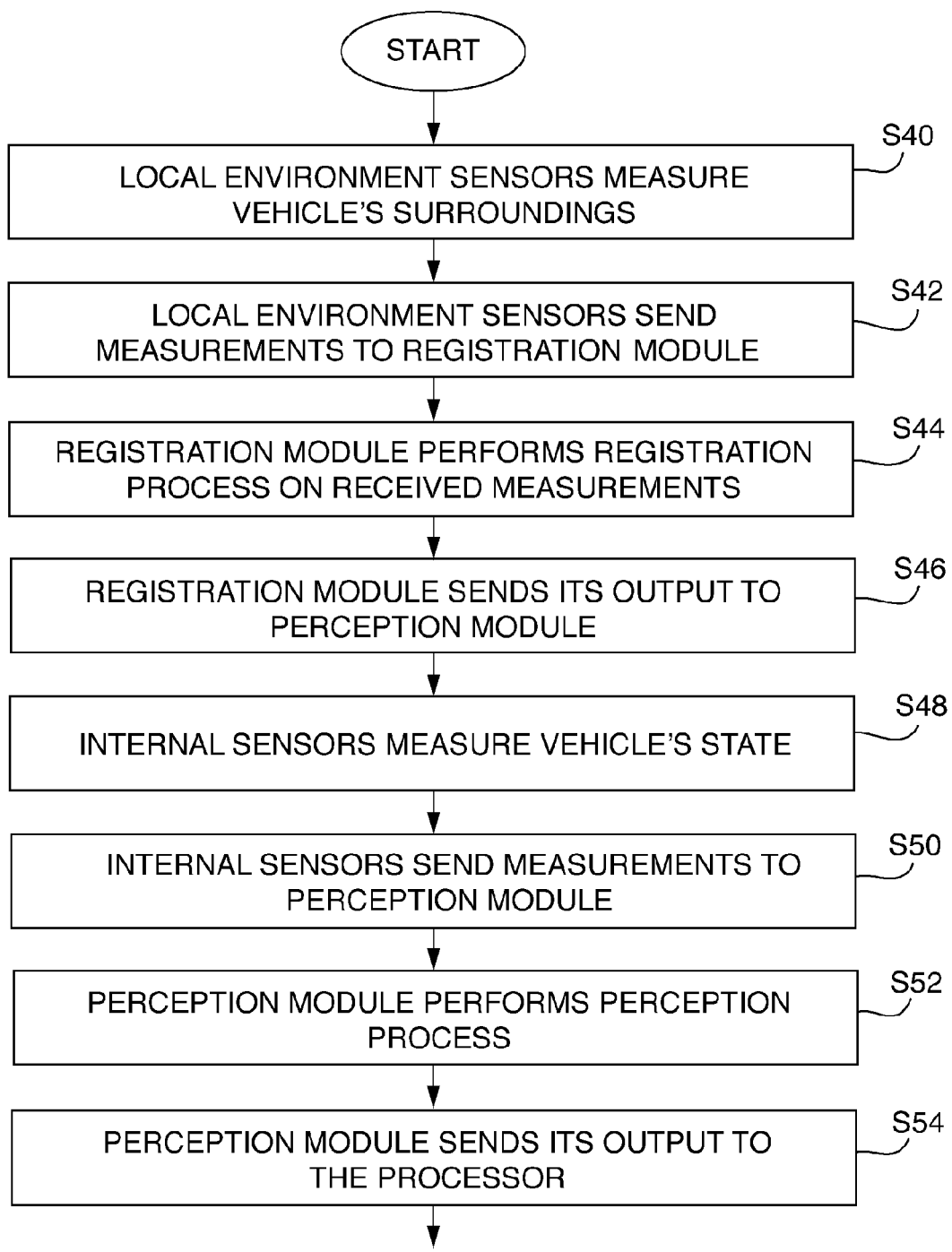

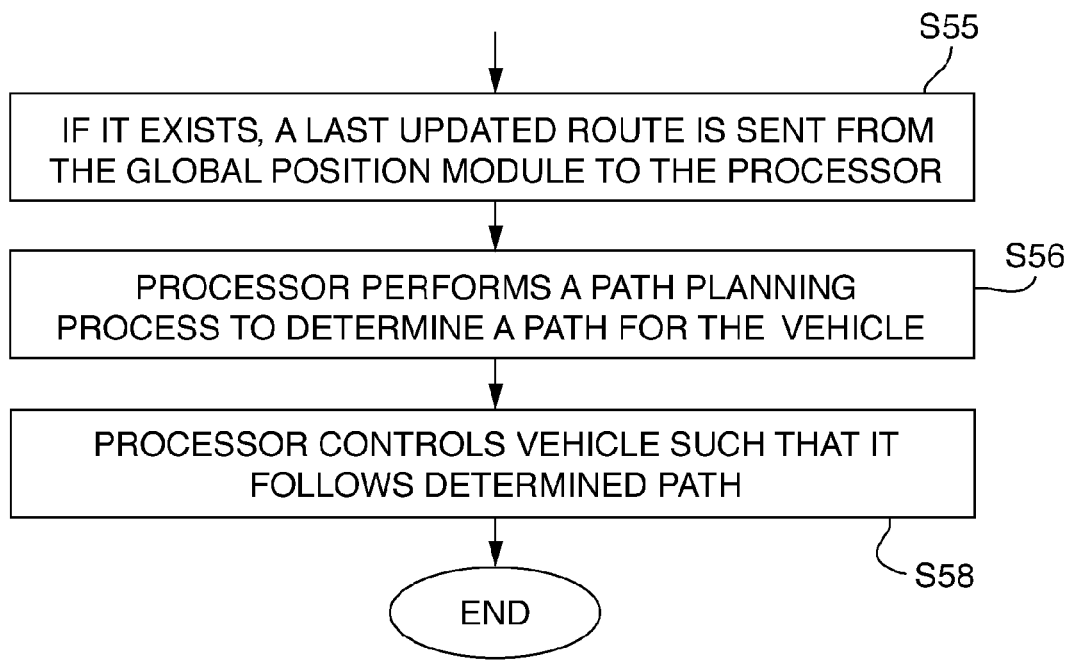

VEHICLE NAVIGATION

FIELD OF THE INVENTION

The present invention relates to the determining of a route for a vehicle

BACKGROUND

Typically, autonomous vehicles perform localisation processes to navigate.

Many conventional autonomous vehicles use an Inertial Navigation System (INS) for localisation.

Typically, a combination of high-error, low-drift sensors and low-error high-drift sensors is used. An example of such a high-error, low-drift sensor is the Naystar Global Positioning System (GPS) which may be used to measure (global) positions for the vehicle. An example of a low-error, high-drift sensor is an Internal Measurement Unit (IMU) which may be used to measure turn rates, velocities and accelerations etc. for the vehicle.

However, an INS tends not to be robust to failure/error of the GPS. This tends to be because without the global position of the vehicle (determined by the GPS), linear speeds of the vehicle tend to be unobservable and, over time, an error associated with this value can become very large.

Thus, the performance of an autonomous vehicle tends to be adversely effected in environments in which a GPS signal is intermittent, or not present. Moreover, to keep the vehicle moving safely in such environments it tends to be necessary for the vehicle's localisation system to keep within the performance specification required by the sensor fusion and control systems. For example, if error(s) in speeds became greater than those permitted the perception and control systems of the vehicle, the vehicle will tend no longer to be able to see or steer through the world reliably. Therefore, the motion of the vehicle tends to be unsafe.

SUMMARY OF THE INVENTION

In a first aspect, the present invention provides a method for establishing a route for an autonomous vehicle, the method comprising: determining localisation information for the vehicle with respect to a first frame of reference by performing a perception process to localise the vehicle with respect to the first frame of reference, the first frame of reference being a frame of reference that is substantially fixed with respect to a current state of the vehicle; determining localisation information for the vehicle with respect to a second frame of reference by performing a perception process to localise the vehicle with respect to the second frame of reference, the second frame of reference being a frame of reference that is substantially fixed with respect to an entity, the entity being different to the vehicle, and the vehicle being moveable with respect to the entity; establishing a route for the vehicle with respect to the second frame of reference using the localisation information for the vehicle with respect to the second frame of reference; performing a transformation of the route from the second frame of reference to the first frame of reference, thereby providing a transformed route; and determining a route for the vehicle with respect to the first frame of reference using the localisation information for the vehicle with respect to the first frame of reference and the transformed route.

The method may further comprise a step of controlling the vehicle such that it substantially follows the determined route.

The step of determining localisation information for the vehicle with respect to a first frame of reference may comprise using one or more sensors to measure values of a parameter within the vehicle's local environment, and using the measured values to performing a perception process to localise the vehicle with respect to the first frame of reference.

The one or more sensors may comprise at least one of a visible light detecting camera and a Light Detection and Ranging sensor.

The step of determining localisation information for the vehicle with respect to a first frame of reference may further comprise performing an object detection process using the measured parameter values, and the localisation information for the vehicle with respect to a first frame of reference comprises information relating to objects detected within the vehicle's local environment.

The determined route may be such that, were the vehicle to follow the determined route, detected objects would be avoided.

The entity may be the Earth.

The step of determining localisation information for the vehicle with respect to a second frame of reference may comprise receiving a signal from a further entity, the further entity being remote from the vehicle, and the further entity having a known and/or substantially fixed position with respect to the Earth.

The further entity may be a Global positioning System satellite.

The method may further comprise specifying a task for the vehicle, wherein the established route is such that, were the vehicle to follow the established route, the task would be completed.

The vehicle may be a land-based vehicle.

In a further aspect, the present invention provides apparatus for establishing a route for an autonomous vehicle, the apparatus comprising one or more processors arranged to: determine localisation information for the vehicle with respect to a first frame of reference by performing a perception process to localise the vehicle with respect to the first frame of reference, the first frame of reference being a frame of reference that is substantially fixed with respect to the vehicle; determine localisation information for the vehicle with respect to a second frame of reference by performing a perception process to localise the vehicle with respect to the second frame of reference, the second frame of reference being a frame of reference that is substantially fixed with respect to an entity, the entity being different to the vehicle, and the vehicle being moveable with respect to the entity; establish a route for the vehicle with respect to the second frame of reference using the localisation information for the vehicle with respect to the second frame of reference; perform a transformation of the route from the second frame of reference to the first frame of reference, thereby providing a transformed route; and determine a route for the vehicle with respect to the first frame of reference using the localisation information for the vehicle with respect to the first frame of reference and the transformed route.

In a further aspect, the present invention provides a vehicle comprising apparatus according to the previous aspect.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the previous aspect.

BRIEF DESCRIPTION OF THE DRAWINGS

FIG. 5 is a process flow chart showing certain steps of an embodiment of a vehicle navigation method; and FIG. 6 is a process flow chart showing certain steps of the vehicle navigation method performed under a condition of "GPS denial".

DETAILED DESCRIPTION

The terminology "coordinate system" is used herein to refer to a geometric system which uses one or more numbers to uniquely define a position of a point or other geometric element.

The terminology "reference frame" or "frame of reference" is used herein to refer to a combination of a fixed point (typically a coordinate system origin), and a co-ordinate system tied to this origin.

The terminology "localisation" is used herein to refer to a process of determining a current/change in state (e.g. time, position, orientation, speed etc) of an entity (e.g. robots, sensors, obstacles, roads etc) within a frame of reference. A current state can be estimated by either direct measurement of the state or the summation of multiple changes in state from a known point.

The terminology "autonomous navigation" is used herein to refer to a process of controlling (changing) current and futures states of an entity within a reference frame to achieve a goal.

Figure 1:
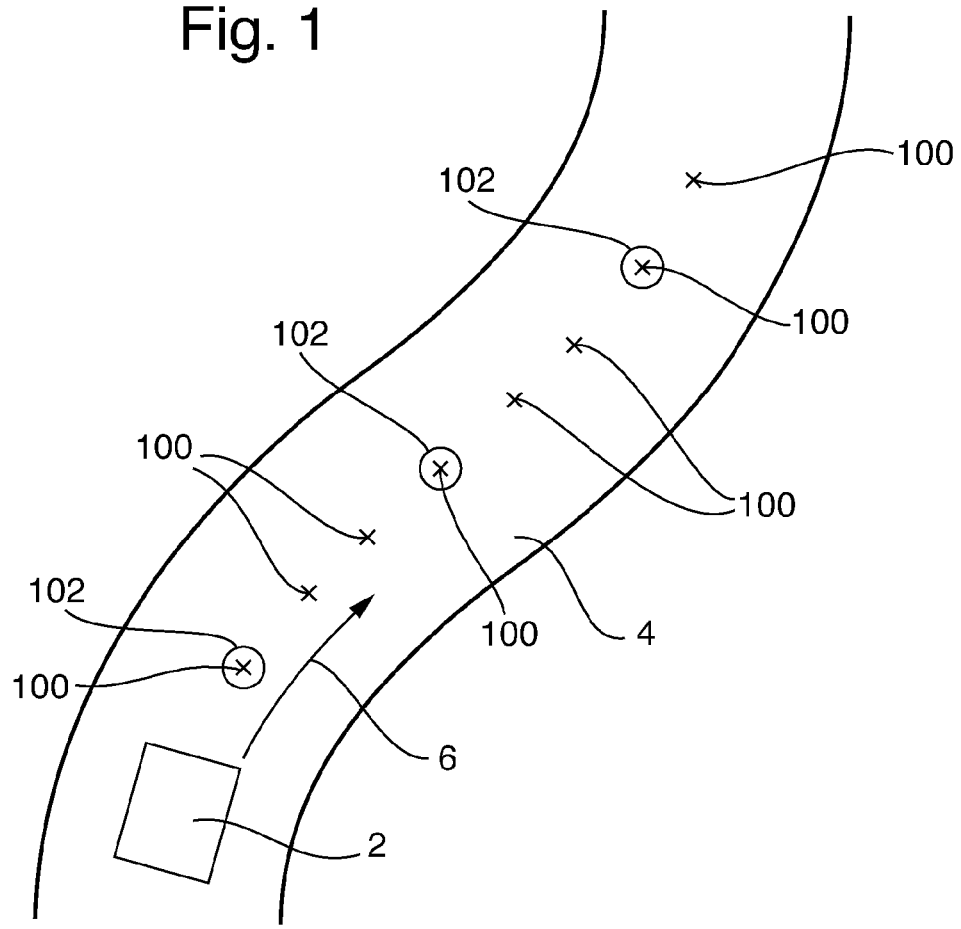
FIG. 1 is a schematic illustration (not to scale) of an example scenario in which an embodiment of a system and method for navigating a vehicle is implemented.

FIG. 1 is a schematic illustration (not to scale) of an example scenario in which an embodiment of a system and method for autonomously navigating a vehicle 2 is implemented.

In this embodiment, the vehicle 2 is an autonomous, land-based vehicle.

In this scenario, the vehicle travels along a road 4. The vehicle travels in a direction indicated by an arrow in FIG. 1 and the reference numeral 6.

In normal operation, as the vehicle 2 travels along the road 4 the vehicle 2 takes measurements of its surroundings. Points along the road 4 at which the vehicle 2 takes measurements of its surroundings are indicated in FIG. 1 by an "X" and the reference numeral 100.

The taking of the measurements of the vehicle's surrounding at the X-points 100 is described in more details later below.

Also in normal operation, as the vehicle 2 travels along the road 4 the vehicle 2 receives a signal from Global Positioning System (GPS) satellites (not shown in FIG. 1). Points along the road 4 at which the vehicle 2 receives the satellite signals are indicated in FIG. 1 by an "O" and the reference numeral 102.

The satellite signals received at the O-points 102 are used by the vehicle 2 to determine the global position of the vehicle 2, as described in more details later below.

In this embodiment, the vehicle 2 taking measurements at the X-points 100, and the vehicle 2 receiving signals at the O-points 102 form part of the method for navigating a vehicle 2, which is described in more detail later below.

Figure 2:
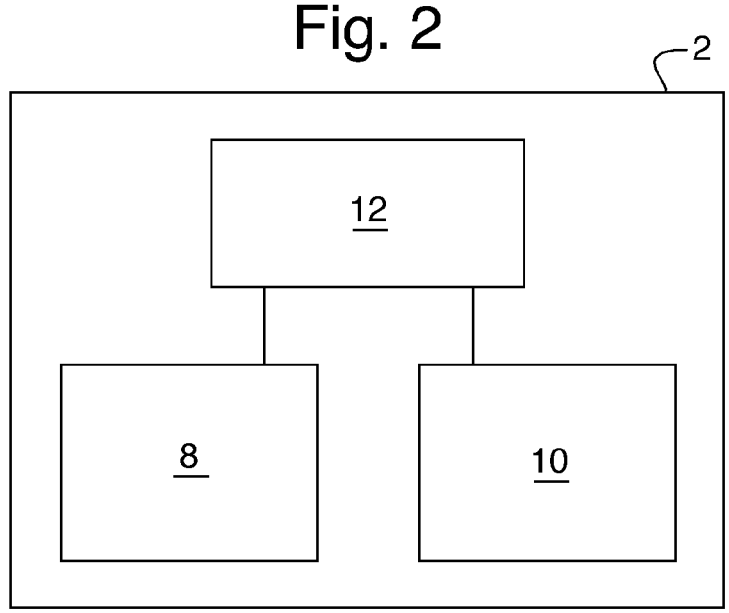
FIG. 2 is a schematic illustration of the vehicle.

FIG. 2 is a schematic illustration of the vehicle 2.

In this embodiment the vehicle 2 comprises a module for inter alia taking (at the X-points 100) and processing measurements of the vehicle's surroundings (i.e. the vehicle's 'local' environment). This module facilitates the motion of the vehicle 2 within its local environment. Thus, this module is hereinafter referred to as the "local motion module" and is indicated in FIG. 2 by the reference numeral 8.

The local motion module 8 is described in more detail later below with reference to FIG. 3.

Also, in this embodiment the vehicle 2 comprises a further module for inter alia receiving (at the O-points 102) and processing satellite signals measurements. This module facilitates the movement/positioning of the vehicle 2 within its global environment. Thus, this module is hereinafter referred to as the "global position module" and is indicated in FIG. 2 by the reference numeral 10.

The global position module 10 is described in more detail later below with reference to FIG. 4.

Also, in this embodiment the vehicle 2 comprises a processor 12. The processor 12 is connected to each of the local motion module 8 and the global position module 10.

In normal operation, the processor 12 receives a signal (i.e. an output) from each of the local motion module 8 and the global position module 10. The processor 12 processes these signals as part of the vehicle navigation method, as described in more detail later below.

Figure 3:
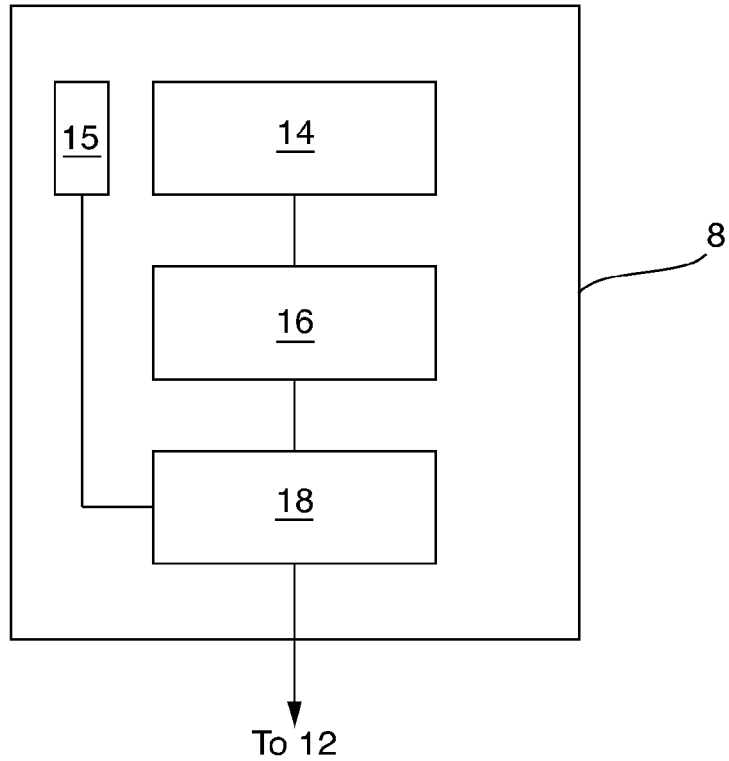
FIG. 3 is a schematic illustration (not to scale) of a local motion module on the vehicle.

FIG. 3 is a schematic illustration (not to scale) of the local motion module 8.

In this embodiment, the local motion module 8 comprises a first plurality of sensors, hereinafter referred to as the "local environment sensors" and indicated in FIG. 3 by the reference numeral 14, a second plurality of sensors, hereinafter referred to as the "internal sensors" and indicated in FIG. 3 by the reference numeral 15, a so-called "registration module 16", and a so-called "perception module 18".

In this embodiment, the local environment sensors 14 are arranged to take measurements of the local environment of the vehicle 2.

In this embodiment, the local environment sensors 14 comprise a visible light detecting camera, and a Light Detecting and Ranging (LIDAR) system. Also, the local environment sensors 14 are adapted to detect obstacles or objects in a vicinity of the vehicle 2.

In this embodiment, the local environment sensors 14 are relatively low-error and relatively high-drift sensors. In other words the error between the actual value of a parameter measured by a local environment sensor 14, and the value of that parameter as measured by that local environment sensor 14 is relatively small. Also, the change in the output signal of a local environment sensor 14 over time, independent of the measured property, is relatively large.

In this embodiment, measurements of the local environment of the vehicle 2 are taken. The frame of reference with respect to which the measurements of the vehicle's local environment are taken is substantially fixed with respect to a current state of the vehicle (i.e. the state of the vehicle is assumed to be known accurately and acts as the fixed point for this reference frame). This frame of reference may be conveniently thought of as a "local" frame of reference (for the vehicle 2).

In this embodiment, the local frame uses a Cartesian co-ordinate system (time, position, orientation, velocities, turn rates and accelerations). The fixed point is the current vehicle state. At start-up, the coordinate system origin corresponds to the vehicle's start-up state.

When performing localisation in the local frame, the summation of changes method is used to estimate a change for the origin of the coordinate system with respect to the fixed point for the local frame (i.e. the vehicle's current state). The change in state of the vehicle with respect to the origin and vice versa is the mathematical inverse of each other. Therefore, within the local frame, as additional state changes are summed over time the accuracy of the estimate of the coordinate system origin tends to decrease, but the vehicle's state is known exactly. In addition the estimate of the origin moves with respect to the global frame(s) and the start-up location.

In this embodiment, the local environment sensors 14 are connected to the registration module 16 such that, in operation, measurements taken by the local environment sensors 14 of the vehicle's surroundings (i.e. local environment) are transmitted from the local environment sensors 14 to the registration module 16.

In this embodiment, in operation the registration module 16 performs a registration process (i.e. an image registration process) on the received measurements. In this embodiment, localisation information previously gathered and processed by the vehicle is used to perform the image registration process. This registration process is described in more detail later below with reference to FIG. 5.

In this embodiment, the registration module 16 is connected to the perception module 18 such that, in operation, an output of the registration module 16 is transmitted from the registration module 16 to the perception module 18.

In this embodiment, the internal sensors 15 are arranged to take measurements indicative of an internal state of the vehicle 2.

In this embodiment, the internal sensors 15 comprise an inertial measurement unit (IMU), and sensors arranged to measure the vehicle's wheel odometry. In this embodiment, the IMU measures the vehicle's velocity, orientation, and gravitational forces acting upon the vehicle 2.

In this embodiment, like the local environment sensors 14, the internal sensors 15 are relatively low-error and relatively high-drift sensors.

In this embodiment, the internal sensors 15 are connected to the perception module 18 such that, in operation, measurements taken by the internal sensors 15 of an internal state of the vehicle 2 are transmitted from the internal sensors 15 to the perception module 18.

In this embodiment, in operation the perception module 18 performs a perception process (i.e. a process by which the vehicle 2 may "perceive" or learn about its environment) on the received signals (from the internal sensors 15 and the registration module 16), as described in more detail later below with reference to FIG. 5.

In this embodiment, the perception module 18 is connected to the processor 12 such that, in operation, an output of the perception module 18 is transmitted from the perception module 18 to the processor 12.

The operation of the local motion module 8, i.e. the components of the local motion module shown in FIG. 3 and described in more detail above, is described in more detail later below with reference to FIG. 5.

Figure 4:
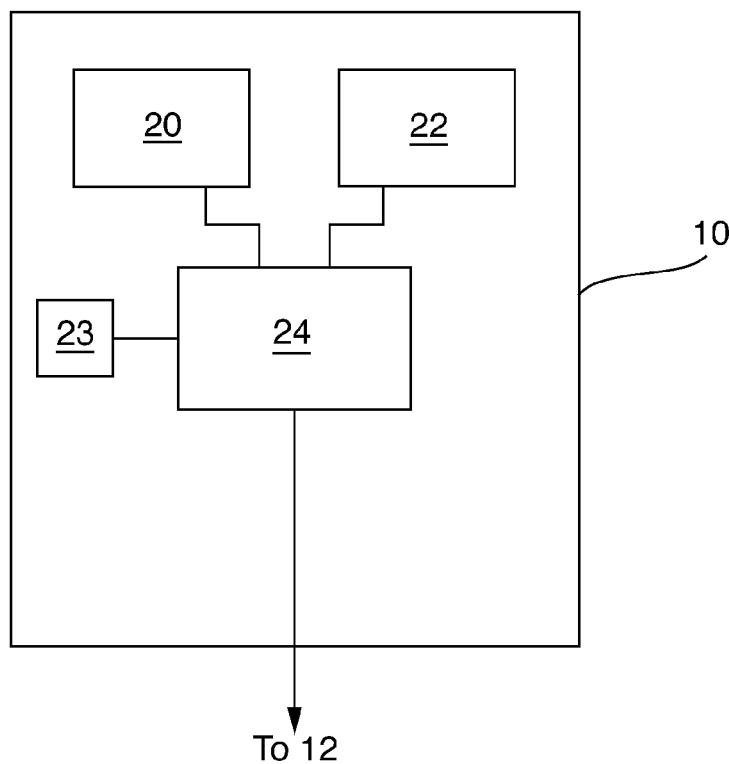
FIG. 4 is a schematic illustration (not to scale) of a global position module on the vehicle.

FIG. 4 is a schematic illustration (not to scale) of the global position module 10.

In this embodiment, the global position module 10 comprises a receiver 20, a so-called "map module 22", a so-called "mission module 23", and a so-called "route planning module 24".

In this embodiment, the receiver 20 is arranged to receive the signals from the satellites (received at the O-points 102).

In this embodiment, the receiver 20 is a relatively high-error and relatively low-drift sensor. In other words the error between the actual value of a vehicle position on Earth and the value of that position as received by the receiver 20 is relatively large. Also, the change in the output signal of the receiver 20 over time, independent of the vehicle's position, is relatively small.

In this embodiment, GPS signals received by the vehicle 2 from the satellites are indicative of vehicle's position etc. with respect to the Earth. In other words, the frame of reference with respect to which the measurements of the vehicle's global position are taken is substantially fixed with respect to the Earth. In this embodiment the Earth is, in effect, an entity that is different to the vehicle 2. Furthermore, the vehicle 2 is moveable with respect to that entity (and so is moveable with respect to the frame of reference that is fixed with respect to the entity). This frame of reference may be conveniently thought of as a "global" frame of reference (for the vehicle 2).

In this embodiment, the global frame is a combination of a Cartesian co-ordinate system (time, position, orientation, velocities, turn rates and accelerations) and a fixed point at the coordinate system origin which corresponds to a fixed point on the Earth. In this embodiment, the WGS84 Universal Transverse Mercator standard is used. The global frame is used as a common system for information exchange between entities, e.g. a user sends an autonomous vehicle to a point on the Earth. When performing localisation, the state of the vehicle is estimated with respect to the origin (fixed point).

In this embodiment, the receiver 20 is connected to the route planning module 24 such that, in operation, the received satellite signals are transmitted from the receiver 20 to the route planning module 24.

In this embodiment, the map module 22 comprises a map of the region in which the vehicle 2 is to be operated in. This may be considered to be a map of the vehicle's global environment. In this embodiment, the map comprises the location of points along the road 4.

In this embodiment, the map module 22 is connected to the route planning module 24 such that, in operation, the map loaded into the map module 22 (i.e. the map of the vehicle's global environment) is transmitted from the map module 22 to the route planning module 24.

In this embodiment, the mission module 23 comprises a mission, or task, to be completed by the vehicle 2. In this embodiment, the mission for the vehicle is loaded onto the mission module (by a user of the vehicle 2). In this embodiment, the mission, or task, for the vehicle 2 is for the vehicle 2 to travel along the road 4 and avoid any obstacles present (i.e. avoid crashing).

In this embodiment, the mission module 23 is connected to the route planning module 24 such that, in operation, the mission details loaded into the mission module 23 (i.e. the vehicle's task) is transmitted from the mission module 23 to the route planning module 24.

In this embodiment, in operation the route planning module 24 performs a route planning process (i.e. it determines a route for the vehicle 2) on the received map, such that the received mission is completed, using the received satellite signals. This process is described in more detail later below with reference to FIG. 5.

In this embodiment, the route planning module 24 is connected to the processor 12 such that, in operation, an output of the route planning module 24 (i.e. the planned route for the vehicle 2) is transmitted from the route planning module 24 to the processor 12.

In this embodiment, in operation the processor 12 performs a so-called "transformation process" using the received output of the route planning module 24 and the received output from the perception module 18. In this embodiment, the transformation process is performed to determine a transformation of the route determined by the route planning module 24 from the vehicle's global frame (i.e. the map) into the vehicle's local frame (i.e. the vehicle's local environment). This process is described in more detail later below with reference to FIG. 5.

Apparatus, including the processor 12 and the various modules, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

FIG. 5 is a process flow chart showing certain steps of an embodiment of a vehicle navigation method, as implemented in the scenario of FIG. 1.

At step s2, the local environment sensors 14 take measurements of the vehicle's surroundings.

In this embodiment, these measurements are taken at regular, and relatively frequent, intervals as the vehicle 2 travels along the road 4 (i.e. at each of the X-points 100).

In this embodiment, the measurements taken by the local environment sensors 14 of the vehicle's surroundings (i.e. local environment) include visible light images taken by the on-board visible light detecting camera, and laser range-based images taken by the on-board LIDAR system.

At step s4, as the measurements (i.e. the images) are taken by the local environment sensors 14, they are transmitted to the registration module 16.

In other words, all measurements taken at a given X-point 100 are transmitted to the registration module 16, e.g. whilst the vehicle 2 is at that X-point 100 (i.e. before measurements are taken for the next X-point 100).

At step s6, the registration module 16 performs a registration process on the received measurements of the vehicle's surroundings. In this embodiment, a conventional registration process is performed by the registration module. In this embodiment, the registration process comprises performing a series of Special Euclidean group, SE(3), transformations (rotation and translations) on the images. Further details on performing SE(3) transformations can be found in Chapter 3.2.3 3D Transforms, Planning Algorithms, ISBN 9780521862059, which is incorporated herein by reference.

In other words, the registration module 16 produces a registered set of images using the images received from the local environment sensors 14 that correspond to a particular X-point 100.

At step s8, the output of the registration process (performed at step s6) is transmitted from the registration module 16 to the perception module 18.

In other words, in this embodiment a registered set of images (that has been determined from the measurements taken at a particular X-point 100) is sent from the registration module 16 to the perception module 18.

At step s10, the internal sensors 15 take measurements of the vehicle's internal state.

In this embodiment, these measurements are taken at regular, and relatively frequent, intervals as the vehicle 2 travels along the road 4 (i.e. at each of the X-points 100).

In this embodiment, the measurements taken by the internal sensors 15 comprise a linear acceleration and an angular velocity for the vehicle (measured by the IMU), and measurements of the vehicle's wheel odometry.

At step s12, the measurements taken by the internal sensors 15 are transmitted to the perception module 18.

At step s14, the perception module 18 performs a perception process using the output of the registration process corresponding to a particular X-point 100 (sent to the perception module 18 at step s8) and the measurements of the vehicle's internal state at that X-point 100 (sent to the perception module 18 at step s12).

In this embodiment, the perception process performed so that, in effect, the vehicle 2 is 'localised' in its local environment. In other words, the position etc. of the vehicle 2 with respect to its surroundings (as measured by the local environment sensors) at a particular X-point 100 is determined.

The perception process performed by the perception module 18 in this embodiment is a conventional autonomous vehicle perception process. Further details on an example perception process can be found in Chapter 9 Occupancy Grid Mapping, Probabilistic Robotics, ISBN 9780262201629, which is incorporated herein by reference.

In this embodiment, the vehicle's perception (i.e. the output of the perception process performed at step s14) is updated as more measurements are taken by the local environment sensors 14 and the internal sensors 15. In other words, the vehicle's perception of its surrounding is updated as measurements for successive X-points 100 are taken and processed.

In this embodiment, an output of the perception process performed at step s14 is a 3D-map, or model, of the vehicle's surroundings, i.e. the local environment of the vehicle 2.

Also, in this embodiment the perception process detects objects or obstacles in the local environment of the vehicle 2. For example, a feature extraction process may be performed on the images taken by the local environment sensors 14 to detect objects/obstacles in those images.

At step s16, the output of the perception process performed by the perception module 18 at step s14 (i.e. the map or model of the vehicle's surroundings) is sent from the perception module 18 to the processor 12.

At step s18, the receiver 20 receives signals from the global positioning satellites.

In this embodiment, these GPS signals are received at regular intervals as the vehicle 2 travels along the road 4 (i.e. at each of the O-points 102).

Also, in this embodiment, these GPS signals are received at a lower frequency than the frequency with which the vehicle takes measurements of its surroundings. In other words, the amount of time between two successive GPS signals being received by the receiver 20 is larger than the amount of between two successive measurements of the local environment of the vehicle 2 taken by the local environment sensors 14 (or indeed the amount of time between two successive measurements of the internal state of the vehicle 2 taken by the internal sensors 15).

At step s20, the satellite signals received at the receiver 20 are sent from the receiver 20 to the route planning module 24.

At step s22, the map loaded into the map module 22 is sent from the map module 22 to the route planning module 24.

At step s24, the details of the vehicle's mission (i.e. the task to be performed by the vehicle 2) is sent from the mission module 23 to the route planning module 24

At step s26, the route planning module 24 determines a route for vehicle 2 using the received satellite signals, map, and mission details.

In this embodiment, the satellite signals are used by the route planning module 24 to determine a current position for the vehicle 2 on the map. Also, the route generated by the route planning module is such that the mission is completed by the vehicle 2, i.e. in this embodiment the determined route for the vehicle 2 is along the road 4.

In this embodiment, the route (i.e. the output from the route planning module 24) is updated as further GPS satellite signals are received at the receiver 20 and sent to the route planning module 24 for processing. In other words, a route for the vehicle to complete its mission is updated as signals received at successive O-points 102 are processed.

At step s28, the route determined by the route planning module 24 is sent from the route planning module 24 to the processor 12.

At step s30, the processor 12 performs a transformation process using the route generated at step s26.

In this embodiment, the transformation process is performed to determine a transformation of the determined route from the vehicle's global frame (i.e. the map) into the vehicle's local frame (i.e. the vehicle's local environment).

In this embodiment, a conventional process for determining a transformation and transforming the route is used. In this embodiment, the process for determining a transformation and transforming the route comprises performing a series of Special Euclidean group, SE(3), transformations (rotation and translations). Further details on performing SE(3) transformations can be found in Chapter 3.2.3 3D Transforms, Planning Algorithms, ISBN 9780521862059, which is incorporated herein by reference.

Thus, the processor 12 receives a 3D-map, or model, of the vehicle's surroundings, and has determined a route in the frame of the vehicle's local environment.

At step s36, the processor 12 performs a path planning process.

This path planning process is performed using the received output of the perception process and the output of the transformation process to determine a path for the vehicle 2. This path is such that the vehicle 2 avoids any objects/obstacles that were detected in the local environment of the vehicle 2, and such that the vehicle would complete its mission if it followed the path.

In this embodiment, a conventional process for path planning is used. Further detail on an example path planning process can be found in Chapter 11, Trajectory Planning, Principles of Robot Motion, ISBN 9780262033275, which is incorporated herein by reference.

Thus, a combination of low-error high-drift sensors (such as the IMU of the local environment sensors 14) and high-error low-drift sensor (such as the GPS) is used to determine a path for the vehicle 2. The system advantageously tends to use the low-drift sensor to measure and compensate for the drift in the low-error sensors.

At step s38, the processor 12 controls the vehicle 2 in such a way that the vehicle 2 follows the path determined at step s36.

Thus, a vehicle navigation process is provided.

An advantage provided by the above described system and method for navigating a vehicle is that the vehicle tends to avoid objects/obstacles present in its local surroundings, whilst being able to position itself in a global frame (i.e. in the world).

The above described system and method tends to advantageously use of two separate co-ordinate frames: one for supporting locally gathered information, and one for remotely gathered (global) information.

The system for supporting locally gathered information (i.e. the local motion module) tends to be usable for aiding a driver, and/or performing local obstacle avoidance, terrain sensing and/or vehicle control without a need for GPS to start-up, and over unlimited GPS dropouts. This system tends to provide an estimate of the change of vehicle pose, but does not use an absolute measurement of position and orientation of the vehicle in a global frame (i.e. in this embodiment, it doesn't know where on the Earth the vehicle is).

The system for supporting remotely gathered (global) information tends to be useable for route planning, mission planning, and multi-platform co-ordination. This system tends to provide an estimate of the absolute pose of the vehicle. It tends to be possible to only use this system (or only have this system operate relatively accurately) when the vehicle is to perform global tasks.

A further advantage provided by the above described multi-frame localisation (i.e. local-frame localisation and global-frame localisation) is that the performance of collision detection and avoidance tends to be decoupled from that of global localisation. This tends to reduce GPS dependence of the system elements required for safe autonomous navigation. Also, this tends to facilitate the use of more robust and lower accuracy global sensors (instead of or in addition to GPS) such as Signals of Opportunity for route and mission planning.

A further advantage provided by the above described system is that the provision of reliable, low-cost autonomous systems tends to be facilitated.

The above provided system and method tends to be robust to sensor failure/error from the GPS sensor. In particular, driver aid, local obstacle avoidance, terrain sensing and/or vehicle control tend to still be provided without global sensor operation. Unbounded or unlimited errors in the global position of the vehicle tend not to impact the performance of the local localisation system. This tends to be in contrast to conventional autonomous vehicles that tend to use an Inertial Navigation System (INS) for localisation, and whose performance is limited when operating in, for example, GPS intermittent environments.

Furthermore, whereas to keep conventional autonomous vehicles moving safely it tends to be necessary for the vehicle's localisation system to keep within the performance specification required by the sensor fusion and control systems, this tends not to be the case when using the above described method/system.

In other words, the above described system and method tends to provide significant navigation advantages, even in when a GPS signal is not available or intermittent.

A further advantage of the above described system and method is that a combination of multiple global sensors (e.g. GPS, RFID in the global environment, etc.) can be used for localisation and path planning. This tends to provide that more accurate localisation/planning solutions can be obtained. Furthermore, using a combination of different global sensors tends to provide a level of redundancy into the system. Thus, is one global sensor system (e.g. GPS) fails, a relatively accurate localisation/planning solution can still be determined using the remaining global sensors.

A further advantage provided by the above described system is that the use of lower update rate global sensors, e.g. Wireless Hotspot/RFID localisation, (as opposed to or in addition to higher update rate global sensors, e.g. GPS) can be used to determine a relatively accurate localisation/planning solution.

What will now be described is a method by which the vehicle 2 operates under a condition of "GPS denial" (i.e. when a GPS signal is not available to the vehicle 2). Such a condition of GPS denial may occur if there is an error with the receiver 20, the GPS satellites, or if the signal from the satellites to the receiver 20 is blocked (e.g. if the vehicle 2 is operating indoors or in a tunnel etc.).

FIG. 6 is a process flow chart showing certain steps of the vehicle navigation method performed under a condition of "GPS denial".

At step s40, the local environment sensors 14 take measurements of the vehicle's surroundings.

In this embodiment, this step is performed in the same way as step s2 as described in more detail above with reference to FIG. 5.

At step s42, as the measurements (i.e. the images) are taken by the local environment sensors 14, they are transmitted to the registration module 16.

In this embodiment, this step is performed in the same way as step s4 as described in more detail above with reference to FIG. 5.

At step s44, the registration module 16 performs a registration process on the received measurements of the vehicle's surroundings to produce a registered set of images.

In this embodiment, this step is performed in the same way as step s6 as described in more detail above with reference to FIG. 5.

At step s46, the output of the registration process (performed at step s44) is transmitted from the registration module 16 to the perception module 18.

In this embodiment, this step is performed in the same way as step s8 as described in more detail above with reference to FIG. 5.

At step s48, the internal sensors 15 take measurements of the vehicle's internal state.

In this embodiment, this step is performed in the same way as step s10 as described in more detail above with reference to FIG. 5.

At step s50, the measurements taken by the internal sensors 15 are transmitted to the perception module 18.

In this embodiment, this step is performed in the same way as step s12 as described in more detail above with reference to FIG. 5.

At step s52, the perception module 18 performs a perception process using the output of the registration process corresponding to a particular X-point 100 (sent to the perception module 18 at step s46) and the measurements of the vehicle's internal state at that X-point 100 (sent to the perception module 18 at step s50).

In this embodiment, this step is performed in the same way as step s14 as described in more detail above with reference to FIG. 5.

At step s54, the output of the perception process performed by the perception module 18 at step s52 (i.e. the map or model of the vehicle's surroundings) is sent from the perception module 18 to the processor 12.

In this embodiment, this step is performed in the same way as step s16 as described in more detail above with reference to FIG. 5.

At step s55, if such a route exists, a last updated route is transmitted from the global position module 10 to the processor 12. If no such route exists, no signal is transmitted from the global position module 10 to the processor 12 at this step.

In this embodiment, a last updated route is understood to be the route that was determined by the route planning module 24 using the GPS signals most recently received at the receiver 20. A last updated route may not exist, for example, if no GPS signals have yet been received by the vehicle 2.

At step s56, the processor 12 performs a path planning process is using the received output of the perception process (sent to the processor 12 at step s54 above) and, if transmitted at step s55, the last updated route (which is transformed by the processor 12 as described above with reference to step s30 of FIG. 5).

In this embodiment, this step is performed in the same way as step s36 as described in more detail above with reference to FIG. 5.

If a last updated route is not available, the path for the vehicle 2 is determined at step s56 using the measurements taken by the local environment sensors 14 and the internal sensors 15 alone. Thus, the vehicle 2 still operates relatively safely under the condition of GPS denial as a path that avoids obstacles/objects is determined for the vehicle 2.

If the path determined at step s56 is determined using a last updated route, the vehicle's position along the route is estimated by the processor 12 using the measurements taken by the local environment sensors 14 and the internal sensors 15 (e.g. the position of the vehicle 2 may be estimated using measurements of the vehicle's wheel odometry, linear acceleration, and angular velocity etc.). However, because the local environment sensors 14 and the internal sensors 15 are high-drift sensors (as described in more detail above with reference to FIG. 3), the uncertainty/error associated with the estimate of the vehicle's position along the route will increase in time. This error is unbounded. This uncertainty/error will be reduced once a GPS signal is received. Nevertheless, the vehicle 2 still operates relatively safely under the condition of GPS denial as a path avoids obstacles/objects (and that approximately follows the last determined route) is determined for the vehicle 2.

At step s58, the processor 12 controls the vehicle 2 in such a way that the vehicle 2 follows the path determined at step s56.

Thus, a method by which the vehicle 2 operates under a condition of "GPS denial" is provided.

It should be noted that certain of the process steps depicted in the flowcharts of the Figures and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the vehicle is a land-based, autonomous vehicle. However, in other embodiments the vehicle is a different type of vehicle. For example, in other embodiments, the vehicle is an aircraft or sea-based vehicle and/or the vehicle is a semi-autonomous vehicle.

In the above embodiments, the vehicle navigation system and method is implemented in the scenario of FIG. 1. In this scenario, the vehicle is tasked to drive along the road. However, in other embodiments the method/system is implemented in a different scenario, e.g. a scenario in which the vehicle is to perform a different task. For example, the vehicle may be tasked to follow a sequence of way-points, and/or deliver a payload to a particular location.

In the above embodiments, the system and method was implemented using a single vehicle. However, in other embodiments the system/method is implemented using a different number of vehicles, e.g. a team of vehicles. In such an embodiment, the vehicles may communicate with other, for example, such that a path for each vehicle is determined depending on the paths for the other vehicles.

In the above embodiments, measurements of the vehicle's surroundings (i.e. local environment) and the measurements of the internal state of the vehicle are taken at regular intervals (i.e. at each of the X-points). However, in other embodiments measurements of the vehicle's surroundings and/or the measurements of the internal state of the vehicle are taken at irregular intervals. In other embodiments, the measurements of the vehicle's surroundings are taken at different times to the measurements of the internal state of the vehicle are taken. Also, the measurements of the vehicle's surroundings and/or the measurements of the internal state of the vehicle may be taken at discrete time-steps, or continuously.

In the above embodiments, in normal operation, GPS signals are received by the vehicle at regular intervals. However, in other embodiments GPS signals are received by the vehicle at irregular intervals. Also, GPS signals may be received by the vehicle at discrete time-steps, or continuously.

In the above embodiments measurements of the vehicle's surroundings and the measurements of the internal state of the vehicle are taken more frequently than the GPS signals are received. However, in other embodiments measurements of the vehicle's surroundings and/or the measurements of the internal state of the vehicle are taken less frequently than, or with substantially the same frequency as, the GPS signals are received.

In the above embodiments, the local environment sensors comprise a visible light detecting camera, and a LIDAR system. However, in other embodiments the local environment sensors include one or more different appropriate sensors instead of or in addition to the camera and/or the LIDAR system. For example, in other embodiments, the local environments sensors comprise a Radar system for detecting objects close to the vehicle, or an ultraviolet (UV) or infrared (IR) camera.

In the above embodiments, the internal sensors comprise an IMU and a sensor arranged to measure the wheel odometry of the vehicle. However, in other embodiments the internal sensors include one or more different appropriate sensors instead of or in addition to the IMU and/or wheel odometry sensor, e.g. a visible light detecting camera.

In the above embodiments, a global position for the vehicle is estimated/determined using a GPS. In particular, the receiver of the vehicle receives GPS signals from GPS satellites. These signals are then processed to determined a position for the vehicle. However, in other embodiments a different system for determining/estimating a global (i.e. not local) position for the vehicle is used. For example, a process using Signals of Opportunity (e.g. from a mobile telephone mast) may be performed instead of or in addition implementing the GPS.

In other embodiments, the vehicle comprises more than one different position system. Each of these systems provides a global position for the vehicle determined using a different method used by each of the other systems. The positions provided by these systems may be amalgamated to provide a 'fused' global position for path planning. Alternatively, the positions provided by these systems may be 'ordered' (i.e. put in order of preference) such that, of the determined positions for a given time-step, a sub-set of the determined positions may be used for path planning. Alternatively, the positions used for path planning may be selected depending on the conditions in which the vehicle is operating (e.g. the location, type of terrain etc), and how well the systems determining the positions operate in those conditions.

The invention claimed is:

1. A method for establishing a route for an autonomous vehicle and controlling the vehicle, the method comprising:
   determining localisation information for the vehicle with respect to a first frame of reference by performing a perception process that includes receiving measurements at a measurement interval to localise the vehicle with respect to the first frame of reference, the first frame of reference being a frame of reference that is substantially fixed with respect to a current state of the vehicle;
   determining localisation information for the vehicle with respect to a second frame of reference by performing a perception process that includes receiving signals at a signal interval rate to localise the vehicle with respect to the second frame of reference, the second frame of reference being a frame of reference that is substantially fixed with respect to an entity, the entity being different to the vehicle, and the vehicle being moveable with respect to the entity;
   establishing a route for the vehicle with respect to the second frame of reference using the localisation information for the vehicle with respect to the second frame of reference;
   performing a transformation of the route from the second frame of reference to the first frame of reference, thereby providing a transformed route;
   determining a control route for the vehicle with respect to the first frame of reference using the localisation information for the vehicle with respect to the first frame of reference and the transformed route; and
   controlling the vehicle to follow the control route as determined from the signal that has been most recently received to localise the vehicle with respect to the second frame of reference;
   wherein the measurement interval is less than the signal interval.

2. A method according to claim 1, wherein the step of determining localisation information for the vehicle with respect to the first frame of reference comprises:
   measuring, using one or more sensors, values of a parameter within the vehicle's local environment; and
   using the measured values for performing a perception process to localise the vehicle with respect to the first frame of reference.

3. A method according to claim 2, wherein the one or more sensors comprise at least one of a visible light detecting camera and a Light Detection and Ranging sensor.

4. A method according to claim 2, wherein the step of determining localisation information for the vehicle with respect to the first frame of reference comprises:
   performing an object detection process using the measured parameter values, and the localisation information for the vehicle with respect to the first frame of reference includes information relating to objects detected within a local environment of the vehicle.

5. A method according to claim 4, wherein the determining of the route comprises:
   selecting a route such that, were the vehicle to follow the determined route, detected objects would be avoided.

6. A method according to claim 1, wherein the entity is the Earth.

7. A method according to claim 6, wherein the step of determining localisation information for the vehicle with respect to the second frame of reference comprises:
receiving a signal from a further entity, the further entity being remote from the vehicle, and the further entity having a known and/or substantially fixed position with respect to the Earth.

8. A method according to claim 7, wherein the further entity is a Global Positioning System satellite.

9. A method according to claim 1, comprising:
specifying a task for the vehicle, wherein the established route is such that, were the vehicle to follow the established route, the task would be completed.

10. A method according to claim 1, wherein the vehicle is a land-based vehicle.

11. Apparatus for establishing a route for an autonomous vehicle and for controlling the vehicle, the apparatus comprising one or more processors programmed to:
determine localisation information for the vehicle with respect to a first frame of reference by performing a perception process that includes receiving measurements at a measurement interval to localise the vehicle with respect to the first frame of reference, the first frame of reference being a frame of reference that is substantially fixed with respect to a current state of the vehicle;
determine localisation information for the vehicle with respect to a second frame of reference by performing a perception process that includes receiving signals at a signal interval to localise the vehicle with respect to the second frame of reference, the second frame of reference being a frame of reference that is substantially fixed with respect to an entity, the entity being different to the vehicle, and the vehicle being moveable with respect to the entity;
establish a route for the vehicle with respect to the second frame of reference using the localisation information for the vehicle with respect to the second frame of reference;
perform a transformation of the route from the second frame of reference to the first frame of reference, thereby providing a transformed route;
determine a control route for the vehicle with respect to the first frame of reference using the localisation information for the vehicle with respect to the first frame of reference and the transformed route; and
control the vehicle to follow the control route as determined from the signal that has been most recently received to localise the vehicle with respect to the second frame of reference;
wherein the measurement interval is less than the signal interval.

12. An apparatus according to claim 11 further comprising the vehicle.

13. A program or plurality of programs stored on a non-transitory machine readable storage medium, such that when executed by a computer system or one or more processors it/they cause the computer system or the one or more processors to operate in accordance with a method that comprises:
determining localisation information for the vehicle with respect to a first frame of reference by performing a perception process that includes receiving measurements at a measurement interval to localise the vehicle with respect to the first frame of reference, the first frame of reference being a frame of reference that is substantially fixed with respect to a current state of the vehicle;
determining localisation information for the vehicle with respect to a second frame of reference by performing a perception process that includes receiving signals at a signal interval rate to localise the vehicle with respect to the second frame of reference, the second frame of reference being a frame of reference that is substantially fixed with respect to an entity, the entity being different to the vehicle, and the vehicle being moveable with respect to the entity;
establishing a route for the vehicle with respect to the second frame of reference using the localisation information for the vehicle with respect to the second frame of reference;
performing a transformation of the route from the second frame of reference to the first frame of reference, thereby providing a transformed route;
determining a control route for the vehicle with respect to the first frame of reference using the localisation information for the vehicle with respect to the first frame of reference and the transformed route; and
controlling the vehicle to follow the control route as determined from the signal that has been most recently received to localise the vehicle with respect to the second frame of reference;
wherein the measurement interval is less than the signal interval.

14. A method according to claim 1, wherein the step of determining localisation information for the vehicle with respect to the first frame of reference comprises:
measuring, using one or more sensors, values of a parameter within the vehicle's local environment; and
using the measured values for performing a perception process to localise the vehicle with respect to the first frame of reference.

15. A method according to claim 14, wherein the entity is the Earth.

16. A method according to claim 15, wherein the step of determining localisation information for the vehicle with respect to the second frame of reference comprises:
receiving a signal from a further entity, the further entity being remote from the vehicle, and the further entity having a known and/or substantially fixed position with respect to the Earth.

17. A method according to claim 16, wherein the further entity is a Global Positioning System satellite.

18. A method according to claim 17, comprising:
specifying a task for the vehicle, wherein the established route is such that, were the vehicle to follow the established route, the task would be completed.

* * * * *